(12) United States Patent
Roesler et al.

(10) Patent No.: US 10,722,851 B2
(45) Date of Patent: Jul. 28, 2020

(54) DISTRIBUTOR TRAY FOR GAS/LIQUID EXCHANGE COLUMN WITH LIQUID DEFLECTOR

(71) Applicant: IFP Energies nouvelles, Rueil-Malmaison (FR)

(72) Inventors: John Roesler, Vienne (FR); Yacine Haroun, Grigny (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 315 days.

(21) Appl. No.: 14/598,548

(22) Filed: Jan. 16, 2015

(65) Prior Publication Data

US 2015/0202578 A1    Jul. 23, 2015

(30) Foreign Application Priority Data

Jan. 21, 2014  (FR) .................................... 14 50482

(51) Int. Cl.
| | | |
|---|---|---|
| *B01F 3/04* | (2006.01) | |
| *B01D 3/20* | (2006.01) | |
| *B01D 47/14* | (2006.01) | |
| *B01D 3/00* | (2006.01) | |
| *B01D 53/18* | (2006.01) | |
| *F25J 3/04* | (2006.01) | |
| *F25J 3/02* | (2006.01) | |

(52) U.S. Cl.
CPC .......... *B01F 3/04078* (2013.01); *B01D 3/008* (2013.01); *B01D 3/20* (2013.01); *B01D 47/14* (2013.01); *B01D 53/185* (2013.01); *F25J 3/0266* (2013.01); *F25J 3/0295* (2013.01); *F25J 3/04927* (2013.01); *B01D 2257/504* (2013.01); *F25J 2200/90* (2013.01); *Y02C 10/12* (2013.01); *Y02E 20/326* (2013.01)

(58) Field of Classification Search
CPC .... B01F 3/04078; F25J 3/0266; F25J 3/0295; F25J 3/04927; F25J 2200/90; B01D 53/185; B01D 3/008; B01D 47/14; B01D 3/20; B01D 2257/504; B01D 53/18; B01D 3/32; Y02E 20/326; Y02C 10/12
See application file for complete search history.

(56) References Cited

U.S. PATENT DOCUMENTS 2,061,830 A * 11/1936 Campbell .............. B01D 3/163
                                            261/113
2,320,822 A *  6/1943 Kerrigan ............... B01D 3/205
                                            261/114.1
(Continued)

FOREIGN PATENT DOCUMENTS

CN      100364652 A      1/2008
CN      102105230 A      6/2011
(Continued)

*Primary Examiner* — Stephen Hobson
(74) *Attorney, Agent, or Firm* — Fitch, Even, Tabin & Flannery, LLP

(57) ABSTRACT

The present invention relates to a distributor tray (2) for a column intended for heat and/or material exchange between a gas and a liquid. The tray comprises gas passage means (4), liquid passage means (6) and distribution means (5) for distributing the liquid with a preferred orientation.
The invention also relates to a heat and/or material exchange column, and to the use of the column.

6 Claims, 6 Drawing Sheets

(56) References Cited

U.S. PATENT DOCUMENTS

| | | | | |
|---|---|---|---|---|
| 3,146,189 A * | 8/1964 | Dick | C10G 49/002 | 208/146 |
| 3,378,349 A * | 4/1968 | Shirk | B01J 8/0492 | 422/607 |
| 3,446,489 A * | 5/1969 | Leva | F28F 25/04 | 261/97 |
| 4,126,539 A * | 11/1978 | Derr, Jr. | B01J 8/0492 | 208/108 |
| 4,126,540 A * | 11/1978 | Grosboll | B01J 8/0278 | 208/146 |
| 4,133,645 A * | 1/1979 | Scott | B01J 8/0278 | 208/146 |
| 4,235,847 A * | 11/1980 | Scott | B01J 8/0278 | 208/146 |
| 4,427,605 A * | 1/1984 | Meier | B01D 3/20 | 202/158 |
| 4,432,913 A | 2/1984 | Harper et al. | | |
| 4,472,325 A | 9/1984 | Robbins | | |
| 4,557,877 A * | 12/1985 | Hofstetter | B01D 3/008 | 239/450 |
| 4,689,183 A * | 8/1987 | Helms | B01D 3/008 | 261/97 |
| 4,707,340 A * | 11/1987 | Milligan | B01J 8/1827 | 261/114.5 |
| 4,808,350 A | 2/1989 | Robbins et al. | | |
| 4,816,191 A | 3/1989 | Berven et al. | | |
| 4,839,108 A * | 6/1989 | Silvey | B01D 3/008 | 196/100 |
| 4,909,967 A | 3/1990 | Binkley et al. | | |
| 4,981,265 A | 1/1991 | Buhlmann | | |
| 5,051,214 A * | 9/1991 | Chen | B01D 3/008 | 261/97 |
| 5,132,055 A | 7/1992 | Alleaume et al. | | |
| 5,192,465 A * | 3/1993 | Petrich | B01D 3/008 | 261/97 |
| 5,240,652 A * | 8/1993 | Taylor | B01D 3/20 | 261/97 |
| 5,403,561 A | 4/1995 | Koros et al. | | |
| 5,645,770 A * | 7/1997 | McNulty | B01D 3/008 | 261/97 |
| 5,919,405 A * | 7/1999 | Menon | B01D 3/008 | 261/97 |
| 5,935,389 A * | 8/1999 | Hine | B01D 3/20 | 202/158 |
| 6,123,323 A * | 9/2000 | Yoneda | B01D 3/16 | 261/113 |
| 6,173,905 B1 * | 1/2001 | Schultes | B01D 3/008 | 239/194 |
| 6,713,158 B2 * | 3/2004 | McKeigue | B01J 19/32 | 428/184 |
| 7,500,658 B2 * | 3/2009 | Boyer | B01D 53/185 | 261/96 |
| 8,329,974 B2 * | 12/2012 | Koudil | B01J 8/0085 | 208/108 |
| 8,568,669 B2 * | 10/2013 | Huziwara | B01J 8/0285 | 261/115 |
| 8,697,015 B2 * | 4/2014 | Parimi | B01J 19/2485 | 422/220 |
| 8,906,319 B2 * | 12/2014 | Bazer-Bachi | B01J 8/02 | 208/107 |
| 9,084,961 B2 * | 7/2015 | Tsujiuchi | B01D 53/18 | |
| 9,259,665 B2 * | 2/2016 | Norton | B01D 3/008 | |
| 2002/0157537 A1 * | 10/2002 | Hayashida | F25J 3/04927 | 95/211 |
| 2002/0158350 A1 * | 10/2002 | Ender | B01D 3/008 | 261/97 |
| 2008/0245416 A1 * | 10/2008 | Meier | B01D 3/26 | 137/9 |
| 2009/0134063 A1 | 5/2009 | Huziwara et al. | | |
| 2010/0019061 A1 | 1/2010 | Kumar et al. | | |
| 2011/0127345 A1 * | 6/2011 | Kumar | B05B 1/265 | 239/1 |
| 2015/0251155 A1 * | 9/2015 | Haroun | F25J 3/04909 | 95/211 |

FOREIGN PATENT DOCUMENTS

| | | |
|---|---|---|
| DE | 2752391 A1 | 5/1979 |
| FR | 2203659 A1 | 5/1974 |
| FR | 2569129 A1 | 2/1986 |
| GB | 1004046 * | 9/1965 |
| GB | 1169878 A | 11/1969 |
| JP | S61-035801 A | 2/1986 |
| JP | H07-047258 A | 2/1995 |
| JP | H08-150314 A | 6/1996 |
| WO | 88/02647 A1 | 4/1988 |
| WO | 96028232 A1 | 9/1996 |
| WO | 2006076923 A1 | 7/2006 |
| WO | 2013017804 A1 | 2/2013 |
| WO | 2014199035 A2 | 12/2014 |
| WO | 2015090476 A1 | 6/2015 |

* cited by examiner

DISTRIBUTOR TRAY FOR GAS/LIQUID EXCHANGE COLUMN WITH LIQUID DEFLECTOR

FIELD OF THE INVENTION

The present invention relates to the sphere of gas/liquid contact columns, and more particularly to gas treatment, $CO_2$ capture or distillation units.

BACKGROUND OF THE INVENTION

Gas treatment units and/or $CO_2$ capture units using amine wash processes and/or distillation units comprise columns for material and/or heat exchange between a gas and a liquid, which can be for example liquid or gaseous fluid absorption and regeneration columns. These columns operate under counter-current or co-current gas/liquid flow conditions.

The columns used in these gas treatment and/or $CO_2$ capture and/or distillation and/or dehydration units generally operate on the principle of material and/or heat exchange between the gas and the fluid that circulate in the columns. FIG. 1 shows a particular case of a gas treatment column top (1) equipped with a distributor tray. Conventionally, this gas treatment column (1) comprises several sections (3) filled by a contactor, notably a packing, and a distributor tray (2) is arranged above each section (3). Gas/liquid contactor (3) contacts gas (G) with liquid (L) so as to allow exchanges.

For example, standard distributors (2) used in absorption/regeneration or distillation columns generally consist of a collector/distributor tray equipped with chimneys (4) or casings allowing passage of the gas (see FIG. 2). Distribution of the liquid occurs through passage thereof in orifices (5) positioned in the lower part of tray (2) and distribution of the gas occurs through casings (4). Each casing (4) allows passage of the gas, according to the counter-current or co-current operating mode, from the lower part of the column to the upper part of column (1), or from the upper part to the lower part. Casings (4) project beyond one side of tray (2) and they are perpendicular thereto. Each casing (4) consists of several walls, parallelepipedic or cylindrical for example, which delimit an inner volume that is open on either side of tray (2). In order to prevent the liquid from flowing into casings (4), the gas outlet or inlet opening above the tray (according to the counter-current or co-current mode) is preferably covered by a cap (also referred to as bevel). The purpose of the distributor tray is to distribute liquid (L) homogeneously onto gas/liquid contactor (3).

In order to optimize exchanges between gas and liquid, many distributor trays have been designed. These distributor/collector trays are mainly divided into two major families:

distributor/collector systems with chimneys, as described in patent applications GB-1,169,878A, U.S. Pat. Nos. 4,808, 350A, 4,472,325A, 4,427,605A, 4,839,108A, FR-2,203,659. For this type of system with chimneys, the liquid is distributed via orifices provided on the tray or via liquid passage chimneys equipped with orifices or slots (see example of FIG. 2), and the gas is distributed through gas passage chimneys or casings. Distribution of the liquid occurs through orifices provided on the tray or by means of liquid passage chimneys. It is well known that liquid distribution through orifices provided on the tray does not allow a high liquid flow rate flexibility to be obtained. Liquid distribution using chimneys provides good flexibility but does not allow to obtain homogeneous distribution of the liquid on the contactor without a large number of orifices or chimneys, thus leading to a complex and heavy tray (large number of liquid passage chimneys), systems with distributor casings provided with a dedicated feed distribution (upstream collecting system or intermediate feed), as described in patent applications U.S. Pat. Nos. 4,909,967, 4,816,191, 4,981,265, DE-2,752,391, WO-8,802,647, FR-2,569,129, or distributor/collector systems with casings for passage of the gas as described in patent applications U.S. Pat. Nos. 4,689,183, 5,132,055, 4,432,913. These distributor types are most often provided with liquid distribution systems arranged on the gas passage casings.

Furthermore, distributor trays fitted with deflectors for liquid distribution on the contactor have been developed (see for example patent applications US-2010-019,061, US-2009-0,134,063, U.S. Pat. No. 5,403,561, CN-100,364, 652). However, most of them are designed for columns operating under co-current conditions where the purpose of the deflector is to disperse the liquid in form of droplets. Now, in liquid distributors used in counter-current processes, the formation of droplets likely to be carried along by the gas to the detriment of the process efficiency needs to be prevented. Liquid flows at the deflector outlet in counter-current processes have to be dense jets. Moreover, the purpose of these deflectors is to provide homogeneous distribution of the fluid in all directions.

The flow of liquid in packings is different depending on the packing technology. On a random packing, the dispersion (diffusion) of the liquid in the packing bed is isotropic. On the other hand, on a structured packing, the plates greatly restrict the liquid dispersion orientation to directions parallel to the plates (a certain secondary dispersion perpendicular to the plates can however occur due to the existence of small openings on the plates, generally orifices). Dispersion in directions perpendicular to the plates occurs subsequently upon moving to the next packing section whose plates are generally positioned at 90°, but it is not ensured for the first section (upper section). For a conventional distributor tray, as the distribution of the liquid is not oriented, the unexploited surface area on the first structured packing section is estimated at 70%.

To overcome these problems, the present invention relates to a distributor tray for a column intended for heat and/or material exchange between a gas and a liquid. The tray comprises gas passage means, liquid passage chimneys and distribution means for distributing the liquid with a preferred orientation. Thus, the invention allows to provide a good liquid distribution quality and to improve the gas/liquid exchange efficiency on at least a first structured packing section using oriented distribution means.

SUMMARY OF THE INVENTION

The invention relates to a distributor tray for a column intended for heat and/or material exchange between a gas and a liquid, comprising means allowing passage for said gas through said tray and at least one chimney allowing passage of said liquid through said tray. Said tray furthermore comprises liquid distribution means projecting beyond the lower part of said tray for distributing said liquid coming from said chimney with a preferred orientation.

According to the invention, said liquid distribution means distribute said liquid in form of at least one jet.

Advantageously, said tray being arranged above a structured packing, said liquid distribution means are oriented substantially perpendicular to the direction, in a transverse plane, of the plates of the upper layer of said structured packing.

Advantageously, said liquid distribution means are fastened to said chimney by screwing, welding, gluing or insertion in said chimney.

Preferably, said gas passage means consist of casings projecting beyond the upper part of said tray.

According to one embodiment of the invention, said liquid distribution means comprise a pipe equipped with at least one liquid passage means, said pipe being substantially parallel to said tray.

According to a variant, said liquid passage means is an orifice (7, 11) or a tube arranged on said pipe (5).

Advantageously, said pipe comprises a plurality of orifices or tubes aligned along the axial direction of said pipe.

Advantageously, said orifice has the shape of a slot.

Preferably, said pipe comprises a dispersion plate for dispersing the jet coming from said chimney towards said liquid passage means.

According to an aspect of the invention, said liquid passage means is located in the upper part of said liquid distribution means, said liquid distribution means being provided with a deflector for sending the liquid at the outlet of said liquid passage means downwards.

According to an embodiment, said liquid distribution means are shared by several chimneys.

Furthermore, the invention relates to a column intended for heat and/or material exchange between a gas and a liquid, wherein the two fluids are contacted by means of a structured packing. Said column comprises at least one distributor tray according to the invention for distributing said fluids onto said structured packing.

Preferably, said liquid distribution means are oriented substantially perpendicular to the direction, in a transverse plane, of the plates of the upper layer of said structured packing.

Moreover, the invention relates to the use of a column as described above for a gas treatment, $CO_2$ capture, distillation or air conversion method.

BRIEF DESCRIPTION OF THE FIGURES

Other features and advantages of the method according to the invention will be clear from reading the description hereafter of embodiments given by way of non limitative example, with reference to the accompanying figures wherein.

DETAILED DESCRIPTION

The invention relates to a distributor tray for a column intended for heat and/or material exchange between a gas and a liquid, conventionally comprising at least one means allowing passage of the gas through the tray, such as a casing, at least one chimney for passage of the liquid through the tray and at least liquid distribution means. The distributor tray allows to form a liquid guard level on the upper surface thereof. The casings and the chimneys project beyond the upper part of the tray (oriented towards the top of the column), whereas the liquid distribution means project beyond the lower part of the tray (oriented towards the bottom of the column). According to the invention, the liquid distribution means distribute the liquid coming from the chimneys below the tray with a preferred orientation. The preferred orientation is determined depending on the application of the tray (distillation, gas treatment, etc.) and/or the type and the orientation of the contactor (structured packing for example) used in the column. The distributor tray according to the invention is suited for counter-current flows in the heat and/or material exchange column, the gas flowing upward through the casings and the liquid flowing downward through the chimneys and the distribution means. However, it is also suited for co-current flows.

Figure 4:
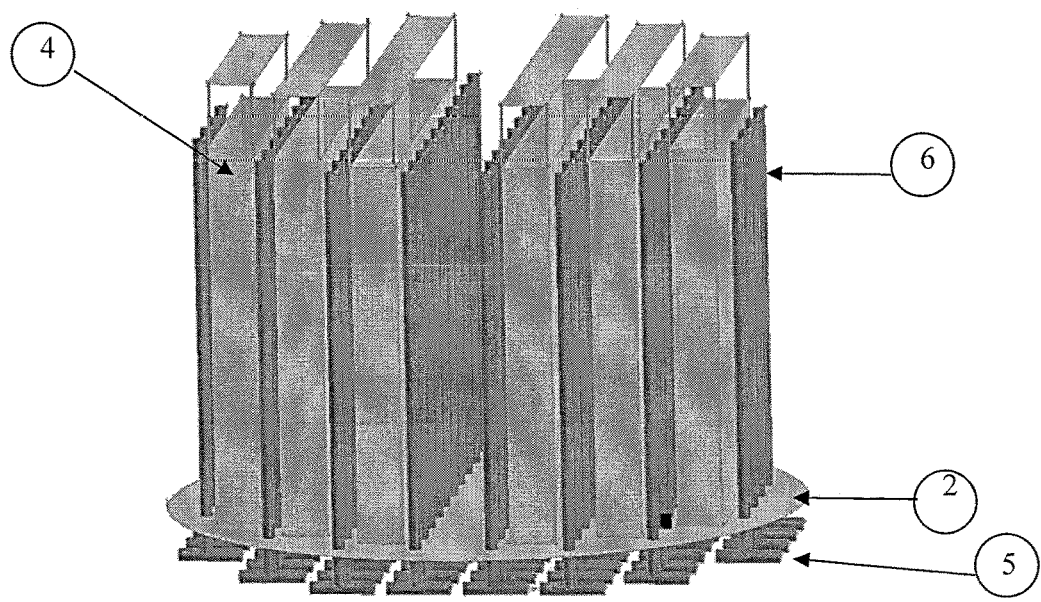
FIG. 4 illustrates an example of a distributor tray according to the invention.

FIG. 4 illustrates a distributor tray according to an embodiment of the invention. For this embodiment example, distributor tray (2) is equipped with casings (4) allowing passage of the gas through the tray, chimneys (6) allowing passage of the liquid through tray (2) and liquid distribution means (5). Liquid distribution means (5) are connected to chimneys (6) and they are all oriented in the same direction so as to distribute the liquid in a preferred direction. The liquid is distributed through orifices provided on the liquid chimneys towards liquid distribution means (5), also referred to as deflectors. According to the embodiment illustrated by way of example, there is a liquid distribution means (5) for each chimney (6).

The casing intended for passage of the gas allows, for a column operating in counter-current mode, passage of the gas from the underside to the top side of the tray. Advantageously, the gas passage casing has a substantially parallelepipedic shape, so as to provide a wide opening for passage of the gas and to limit pressure drops. Furthermore, when the distributor tray comprises several casings for passage of the gas, they can be arranged parallel to one another. The gas passage casings are preferably covered with a cap (also referred to as bevel) for preventing the liquid from flowing into the casings.

The liquid passage means allow passage of the liquid from the top to the underside of the tray. According to the invention, the means allowing passage of the liquid through the tray consist of a set of chimneys. These chimneys, of substantially tubular shape, are arranged between the casings allowing passage of the gas. The number of chimneys is advantageously larger than the number of gas passage casings. The pitch of the chimneys for passage of the liquid can be triangular or square.

Figure 5:
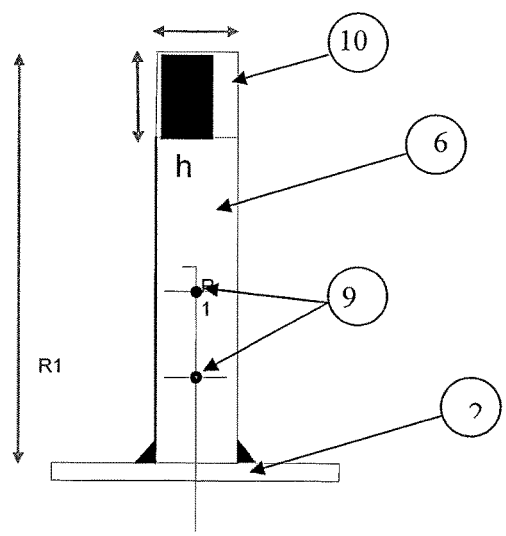
FIG. 5 illustrates a chimney of a distributor tray according to the invention, FIG. 6 diagrammatically illustrates the liquid distribution means of a distributor tray according to the invention.

FIG. 5 is an example of a chimney (6) that can be used for the distributor tray according to the invention. Height H of chimney (6) is lower than the height of the gas passage casings (for example, a chimney (6) can be 600 mm high and a casing can be 700 mm high). In order to prevent liquid from flowing into the gas passage casings when the liquid guard height is great, the chimney has an opening (10). This opening also allows the pressure to be balanced within the chimney. Furthermore, chimney (6) has a cap (or bevel) for preventing liquid from flowing directly into chimney (6). Chimney (6) comprises at least one and preferably, as shown, two radial orifices (9) for inflow of the liquid into the chimney, the liquid being conveyed by gravity beneath the tray. Preferably, when chimney (6) comprises at least two radial orifices (9), they are located at different heights: $h_{R1}$ and $h_{R2}$. Thus, when the liquid flow rate is low, the liquid guard height on the tray (height of liquid in relation to the tray level) is low, only the first radial orifice allows liquid to flow through the tray. When the liquid flow rate is higher, the liquid guard height increases, and the first and second radial orifices allow the liquid to flow through the tray. Due to this characteristic, the distributor tray is suited to various flow rates, it is therefore flexible. The chimney can also comprise several orifice levels (more than 2).

Figure 1:
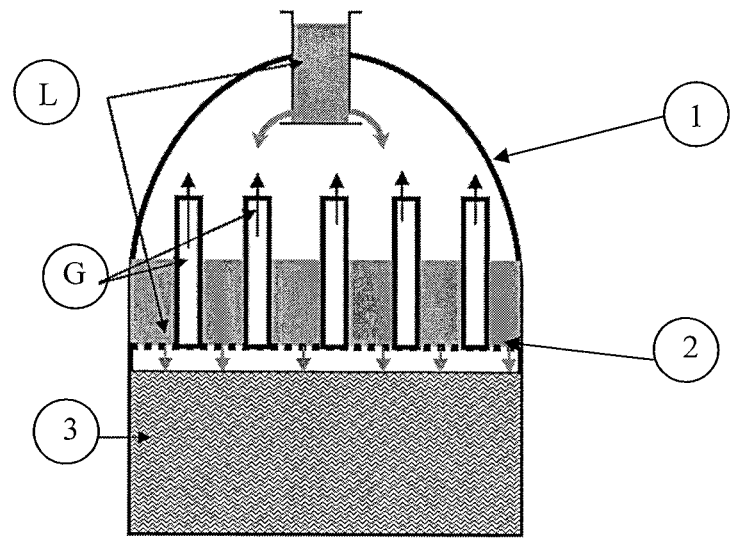
FIG. 1, already described, illustrates the particular case of a gas treatment or $CO_2$ capture column top equipped with a distributor tray, FIG. 2, already described, illustrates a distributor tray according to the prior art.
Figure 2:
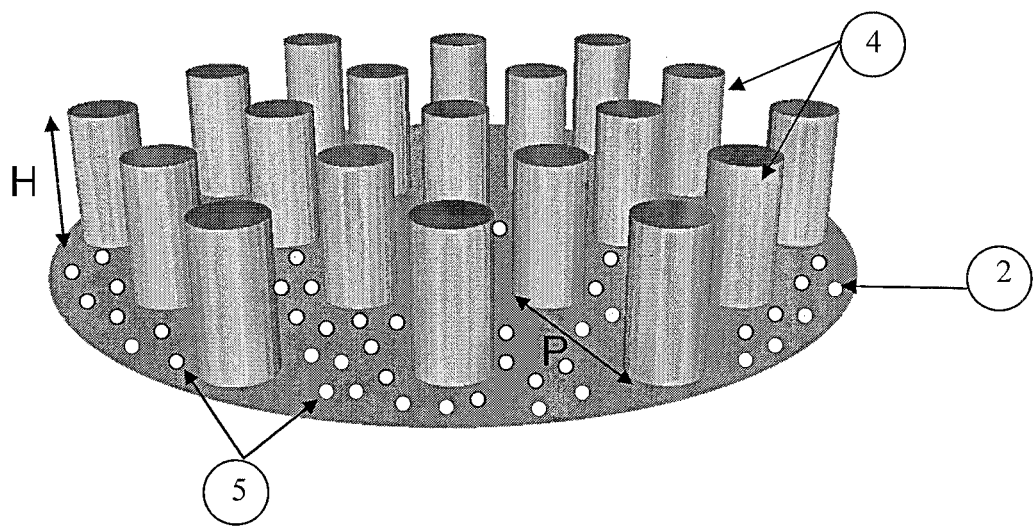
Figure 3:
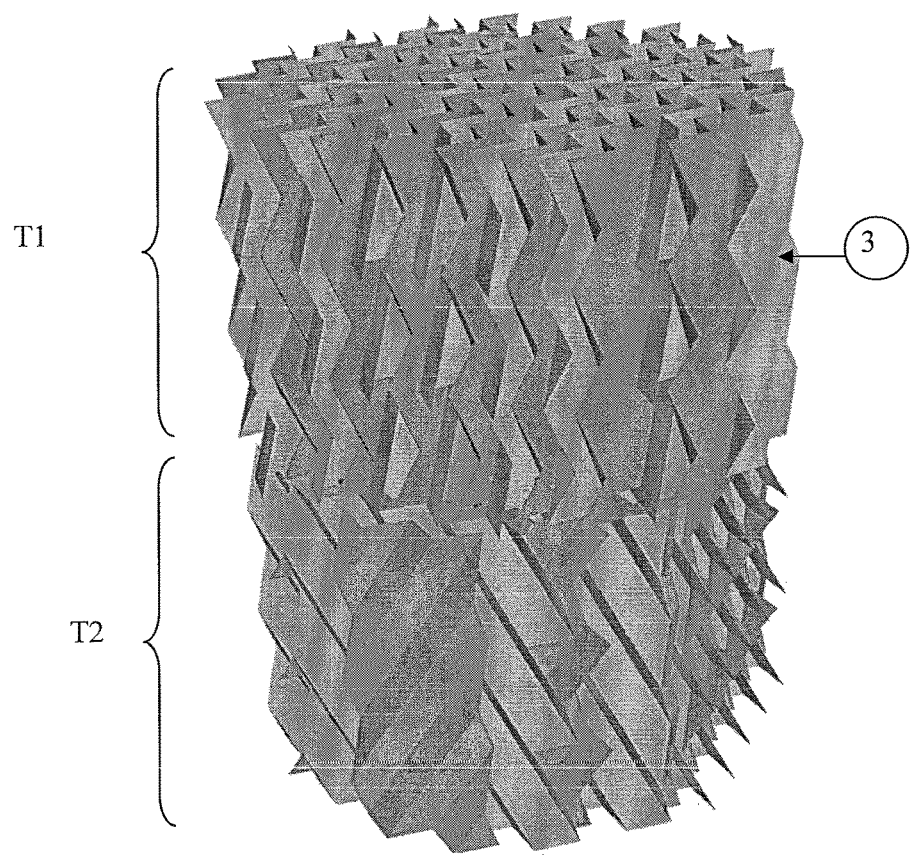
FIG. 3 illustrates an example of a structured packing.

The liquid distribution means allow to distribute the liquid contained in the chimneys onto a contactor, notably a packing (FIG. 1). Packing (3) can be a structured packing as shown in FIG. 3. In this figure and in the next figures, the packing is diagrammatically shown in a non limitative way. A structured packing is generally made up of a set of plates so oriented as to promote exchanges between the liquid and the gas. An example of a structured packing is notably described in patent FR-2,913,353 (US-2010/0,213,625). According to the example illustrated in FIG. 3, the structured packing consists of at least two structured packing sections (T1 and T2). Conventionally, sections (T1 and T2) arranged one above the other are oriented perpendicular to one another. In order to increase the exploited surface area of upper section (T1), the liquid distribution is oriented by the liquid distribution means. The liquid distribution means can therefore be arranged substantially perpendicular to the direction, in a transverse plane, of the plates of upper section (T1) of the structured packing. Indeed, the plates that make up the structured packing comprise, in the transverse plane, a principal direction and the liquid distribution means (5) are orthogonal to this direction. Thus, all the packing plates of the first section are also exploited.

According to one embodiment of the invention, the distribution means have the shape of a cylindrical pipe equipped with means of connection to at least one chimney. Alternatively, the pipe can occur in other shapes, for example prismatic, parallelepipedic, etc. The pipe can be substantially parallel to the tray. The pipe can be equipped with liquid passage means, notably in form of orifices or tubes, preferably bevelled, the liquid passage means allowing distribution with the preferred orientation of the liquid from the pipe to the packing. Advantageously, the liquid passage means distribute the liquid in form of a liquid jet without forming droplets. The pipe is fastened to at least one chimney by the connecting means, notably by screwing, welding, gluing or insertion in the chimney. Connection of the pipe can notably be achieved by means of an internal or external thread.

Figure 6:
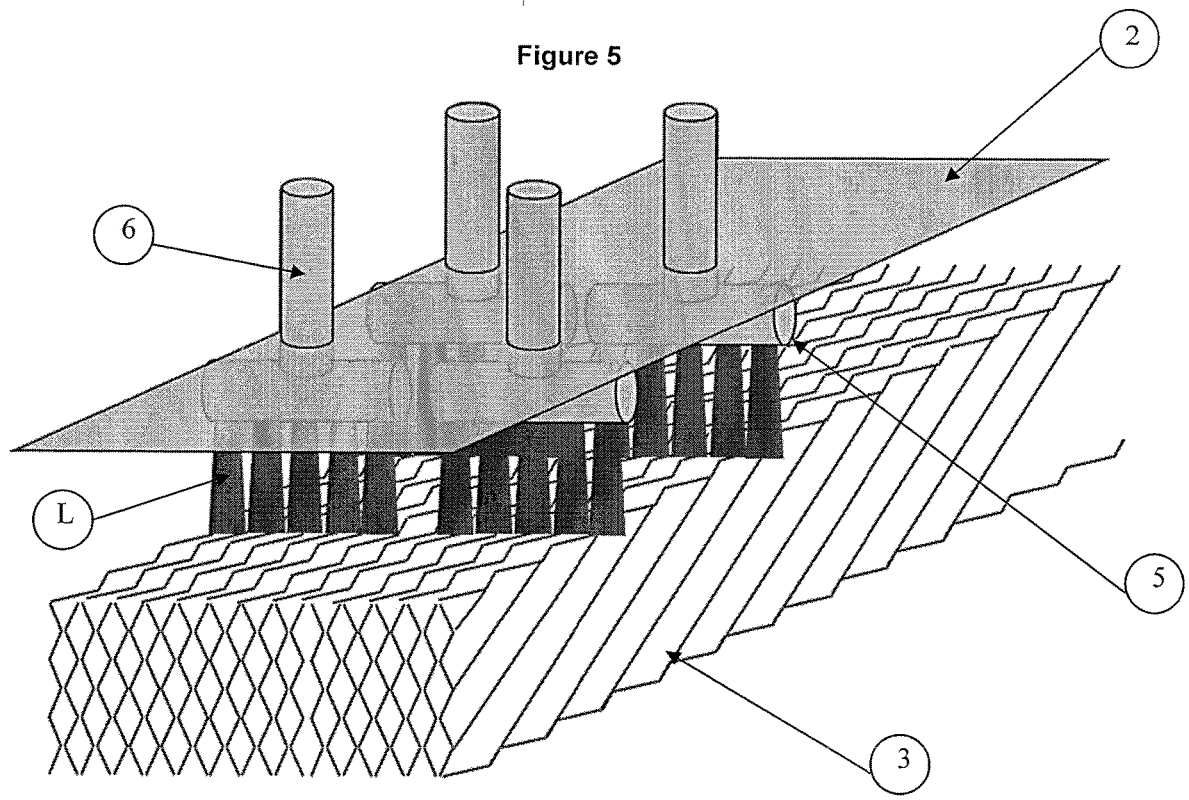

FIG. 6 illustrates an example of a distributor tray (2) arranged above a structured packing (3). In FIG. 6, the means allowing passage of the gas through tray (2) are not shown. According to the embodiment illustrated, chimneys (6) allowing passage of the liquid project on both sides of tray (2). Cylindrical pipes (5) are fastened onto the projection of chimneys (6) on the lower side of tray (2). Cylindrical pipes (5) are parallel to tray (2) and perpendicular to the orientation of structured packing (3), i.e. to the direction of the plates of the upper layer of said structured packing (3) in the transverse plane. The plates that make up the structured packing comprise, in the transverse plane, a principal direction, pipes (5) being orthogonal to this direction. The cylindrical pipes comprise several liquid passage means forming liquid jets on structured packing (3). Liquid jets (L) are represented in black in FIG. 6. Thus, the liquid is more homogeneously distributed over the packing with a preferred orientation and in form of a jet, which promotes material and/or heat exchanges between the gas and the liquid at the packing.

FIGS. 7 to 12 show different embodiments of the distribution means in form of a cylindrical pipe. For these figures, identical elements have the same reference signs. For the description of these figures, only the changes brought to the distribution means of FIG. 6 are described.

Figure 7:
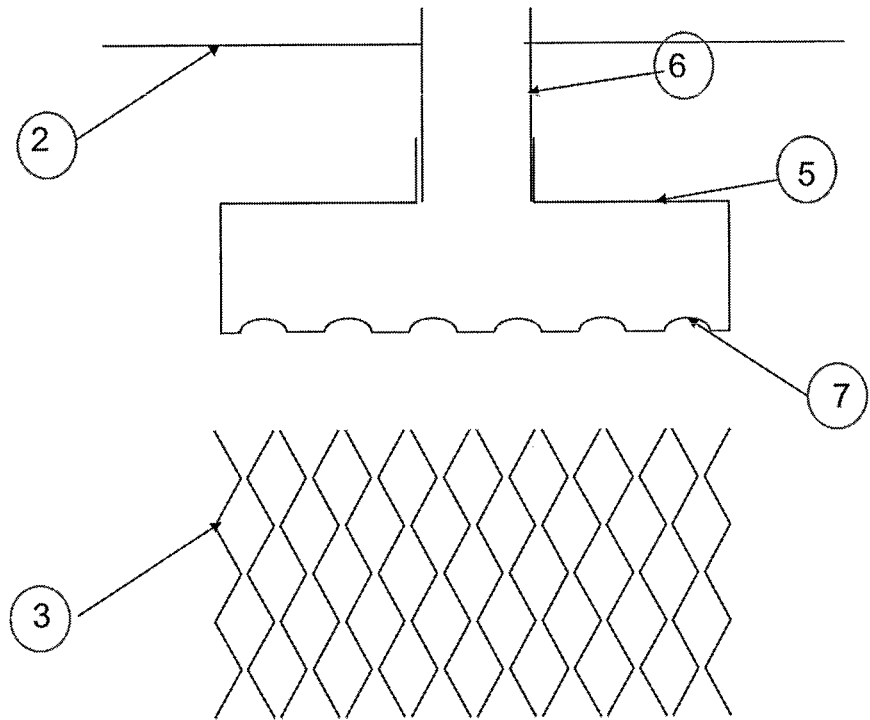
FIG. 7 illustrates a first embodiment of the liquid distribution means according to the invention.

FIG. 7 shows a first embodiment of the distribution means according to the invention. According to this embodiment, the lower part of distribution pipe (5) comprises several orifices (7) sufficiently small to maintain a water guard level and thus to evenly distribute the liquid stream. Orifices (7) can be aligned in the axial direction of cylindrical pipe (5). Advantageously, orifices (7) are substantially circular. Pipe (5) is fastened by connecting means to the outer face of the lower projection of chimney (6).

Figure 8:
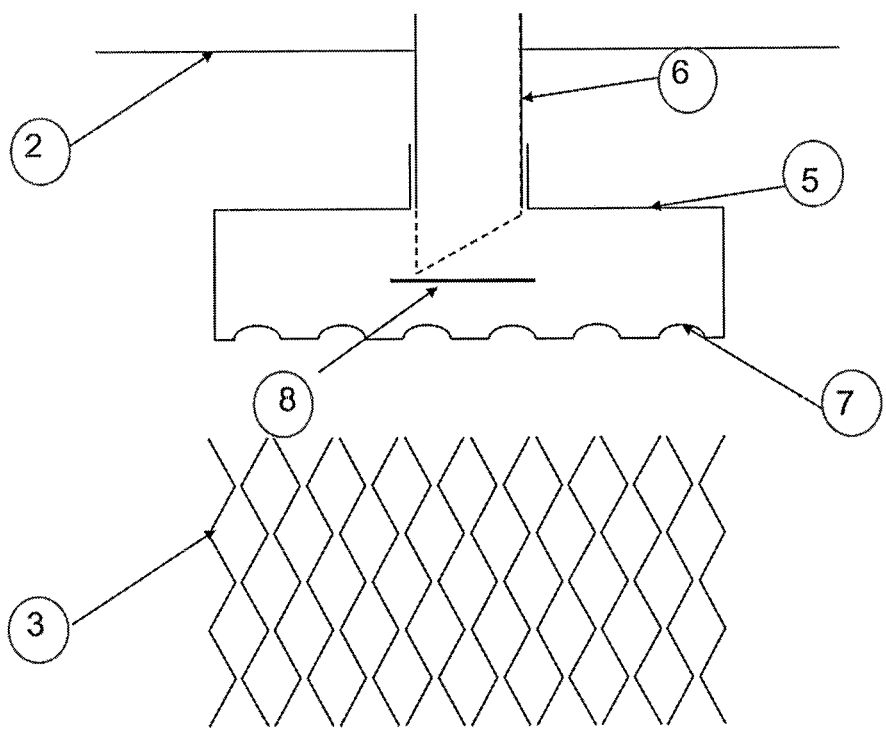
FIG. 8 illustrates a second embodiment of the liquid distribution means according to the invention.

FIG. 8 shows a second embodiment of the liquid distribution means. According to this embodiment where liquid passage means (7) are identical to those of FIG. 7, pipe (5) furthermore comprises a plate or a deflector (8) arranged in cylindrical pipe (5) and located below liquid chimney (6) so as to disperse the descending liquid flow inertia and to prevent supply heterogeneity. As illustrated in this figure, the lower projection of chimney (6) is bevelled. The shape of the chimney projection is not limitative and it can be combined with all the embodiments described.

Figure 9:
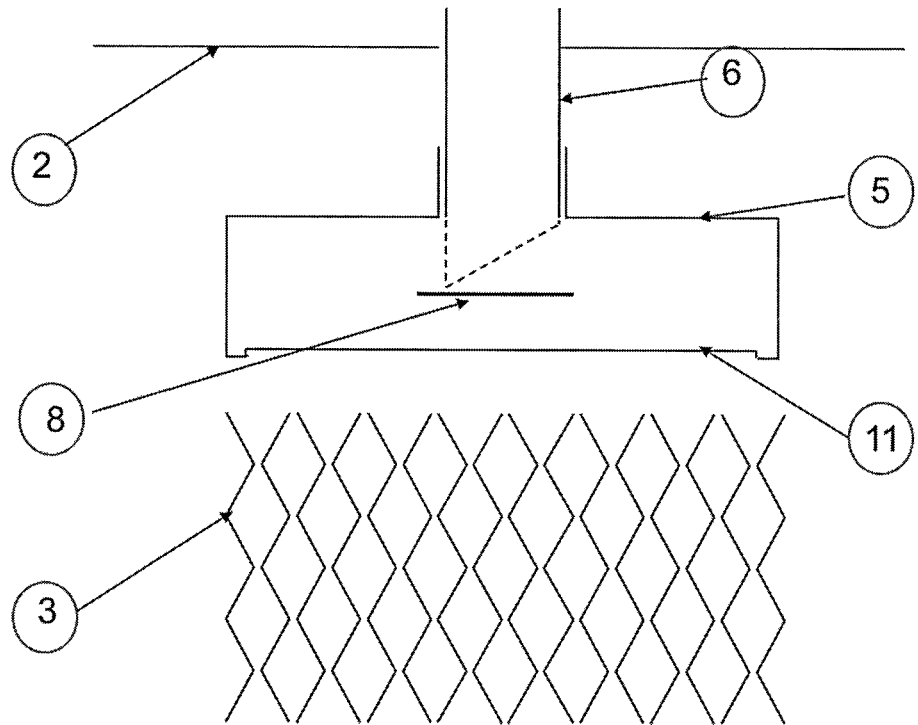
FIG. 9 illustrates a third embodiment of the liquid distribution means according to the invention.

FIG. 9 shows a third embodiment of the liquid distribution means. According to this embodiment, the liquid passage means are provided in the lower part of cylindrical pipe (5) by means of a slot (11). Slot (11) can have a rectangular, oblong or similar shape. In this figure, a deflector (8) is shown, but it is optional.

Figure 10:
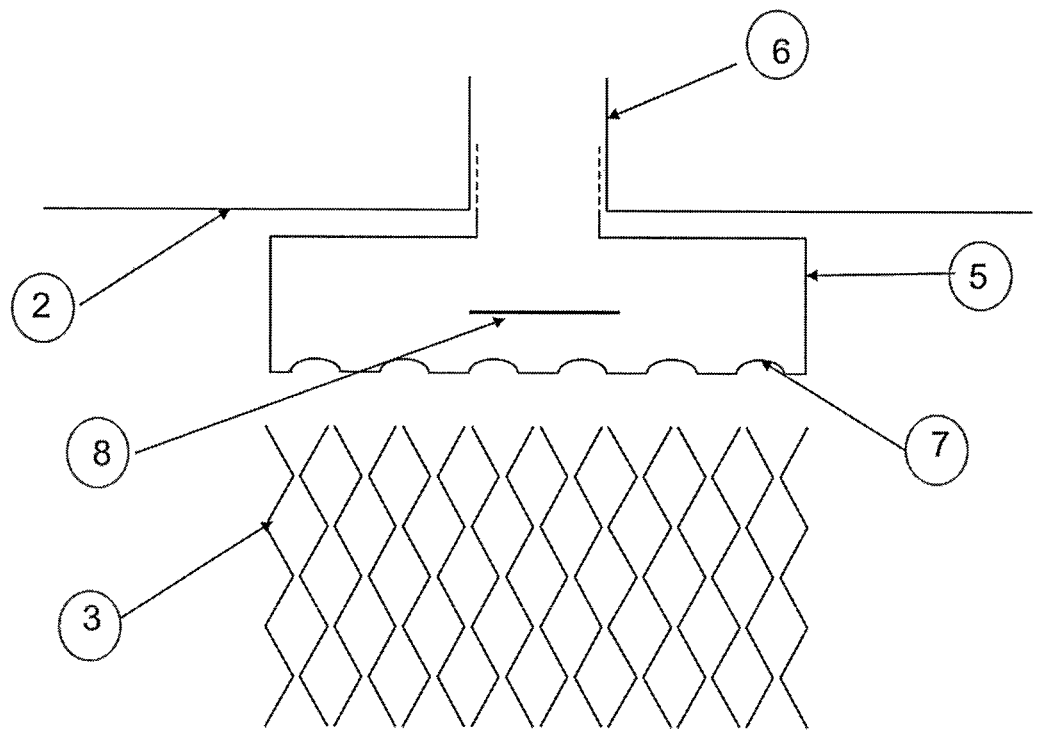
FIG. 10 illustrates a fourth embodiment of the liquid distribution means according to the invention.

FIG. 10 shows a fourth embodiment of the liquid distribution means. According to this embodiment, chimney (6) comprises no lower projection on the lower side of tray (2) and the primary liquid outlet is provided by an orifice flush with lower plate (2) of the distributor, the tube of cylindrical pipe (5) being inserted in this orifice, by screwing for example. As illustrated here, cylindrical pipe (5) comprises several orifices (7) such as described in reference to the first embodiment. This embodiment can be combined with the third embodiment, orifices (7) can be replaced by a slot (11). Moreover, in this figure, a deflector (8) is shown, but it is optional.

Figure 11:
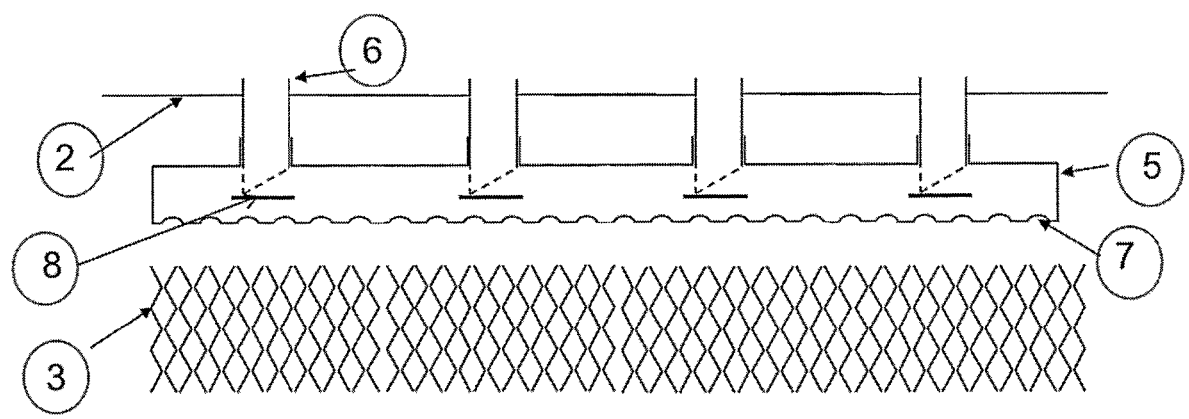
FIG. 11 illustrates a fifth embodiment of the liquid distribution means according to the invention.

FIG. 11 shows a fifth embodiment of the liquid distribution means. According to this embodiment, cylindrical pipe (5) is simultaneously fastened to several chimneys (6) projecting beneath tray (2), notably so as to run right through the column from one end to the other. This embodiment is illustrated with a series of orifices (7) and a series of deflectors (8). However, the series of orifices (7) can be replaced by one or more slots (11). Furthermore, deflectors (8) are optional.

Figures 12A, 12B:
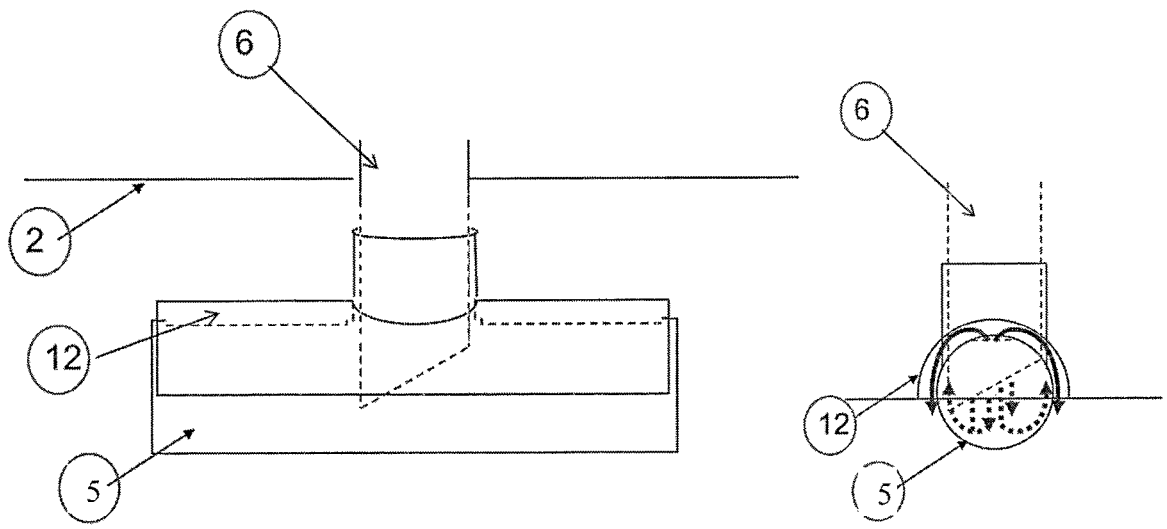
FIGS. 12a and 12b illustrate a sixth embodiment of the liquid distribution means according to the invention.

FIGS. 12a (front view) and 12b (profile view) show a sixth embodiment of the liquid distribution means. According to this embodiment, cylindrical pipe (5) is equipped with an opening in the upper part thereof in form of a slot and with a deflector (12) for driving the liquid downwards while preventing the formation of fine droplets. The arrows in FIG. 12b illustrate the flow of the liquid in cylindrical pipe (5).

Alternatively, according to variant embodiments that are not shown, orifices (7) of the first, second and fourth embodiments can be replaced by vertical tubes. In order to optimize the orientation of the liquid jet on the packing, the tubes can be bevelled.

The liquid distribution means (deflector) can be made for new distributor trays or they can also be installed in existing distributors in case of modification of an existing tray.

The invention thus allows to improve the distribution at least over a first structured packing section through oriented distribution means. The invention also allows to increase the number of injection points with small space requirements. Thus, the invention allows a 3% to 5% potential gain in total exploited surface area over a packing height between two distributors. The gain can even be higher because the distribution on the second packing section is also improved.

The invention also relates to a column (1) for material and/or heat exchange between two fluids, wherein two fluids are contacted by means of at least one gas/liquid contactor (3), column (1) comprising at least a first inlet for a liquid fluid, at least a second inlet for a gaseous fluid, at least a first outlet for a gaseous fluid and at least a second outlet for a liquid fluid. Column (1) also comprises a distributor tray (2) as described above, allowing distribution of the fluids onto contactor (3).

In the particular case where the distributor is positioned at the column top, said distributor can be equipped with a divider arranged above the distributor so as to break the liquid jet coming from the main delivery line of the column. The divider also provides good distribution of the liquid onto the distributor.

Advantageously, gas/liquid contactor (3) is a structured packing bed. In this case, the distribution means are oriented perpendicular to the orientation of the upper layer of the structured packing so as to distribute the liquid in a preferred direction promoting material and/or heat exchanges in the packing.

Preferably, the gas and the liquid flow through column (1) under counter-current conditions.

The column according to the invention can be used in gas treatment, $CO_2$ capture (amine wash for example), distillation or air conversion methods. Furthermore, the invention can be used with any solvent type.

The invention claimed is:

1. A column intended for heat and/or material exchange between a gas and a liquid, comprising:
    a structured packing comprising a plurality of plates; and
    at least one distributor tray comprising:
        a tray provided over a section of the column;
        at least one casing provided on the tray, each casing having a gas passage configured to allow the gas to pass through the tray;
        at least one chimney provided on the tray, each chimney having a liquid passage, separated from the gas passage of the at least one casing, configured to allow the liquid to pass from above the tray, through the tray to an underside of the tray; and
        at least one deflector projecting beyond a lower part of the tray configured to distribute the liquid coming from the at least one chimney with a preferred orientation, the at least one deflector comprising a pipe fastened to the at least one chimney and having a longitudinal axis arranged parallel to the tray and extending in a longitudinal direction substantially perpendicular to a principal direction, in a transverse horizontal plane, of the plates of an upper layer of the structured packing, the pipe having a plurality of orifices provided through the pipe arranged along the longitudinal axis of the pipe, and a dispersion plate arranged in the pipe and located below the at least one chimney for dispersing a jet coming from the at least one chimney towards the plurality of orifices.

2. A column as claimed in claim 1, wherein said at least one deflector is fastened to said at least one chimney by screwing, welding, gluing or insertion in said at least one chimney.

3. A column as claimed in claim 1, wherein the at least one deflector is configured to distribute the liquid in form of at least one jet.

4. A column as claimed in claim 1, wherein a plurality of chimneys is provided and each deflector is shared by several chimneys.

5. A column as claimed in claim 1, wherein said plurality of orifices is located in an upper part of said pipe, said at least one deflector being provided with a further deflector for sending the liquid at an outlet of said plurality of orifices downwards.

6. Use of a column as claimed in claim 1 for a gas treatment, $CO_2$ capture, distillation or air conversion method.

* * * * *